United States Patent [19]

Demange et al.

[11] 4,399,530

[45] Aug. 16, 1983

[54] METHOD AND APPARATUS FOR CODING AND DECODING BINARY DATA

[75] Inventors: Jean-Pierre Demange, Strasbourg; Pierre Lagarde, Dingsheim, both of France

[73] Assignee: La Telephonie Industrielle et Commerciale, Strasbourg, France

[21] Appl. No.: 253,547

[22] Filed: Apr. 13, 1981

[30] Foreign Application Priority Data

Apr. 15, 1980 [FR] France .............................. 80 08666

[51] Int. Cl.³ .......................................... H04L 5/16
[52] U.S. Cl. .................................... 370/31; 375/110; 328/139; 340/347 DD
[58] Field of Search ................ 370/31, 32, 100, 110.1; 375/110, 106; 328/139; 340/347 DD

[56] References Cited

U.S. PATENT DOCUMENTS

| | | | |
|---|---|---|---|
| 3,611,161 | 10/1971 | Claxton | 375/110 |
| 3,863,025 | 1/1975 | Gonsewski et al. | 375/110 |
| 3,967,062 | 6/1976 | Dobias | 375/110 |
| 4,287,589 | 9/1981 | Nakamura et al. | 370/31 |

*Primary Examiner*—Douglas W. Olms
*Attorney, Agent, or Firm*—Robert E. Burns; Emmanuel J. Lobato; Bruce L. Adams

[57] ABSTRACT

A Coding and decoding method for binary data and associated synchronous clock pulses, wherein the transmission is a half-duplex transmission reception system effected over a single pair of conductors which allows both transmission of the binary data and transmission of the associated clock pulses.

9 Claims, 2 Drawing Figures

METHOD AND APPARATUS FOR CODING AND DECODING BINARY DATA

FIELD OF THE INVENTION

The invention relates both to a method for coding and decoding binary data and associated synchronous clock pulses, and to a device for effecting said method.

BACKGROUND OF THE INVENTION

Various synchronous data transmission methods are already known. These known methods require two pairs of conductors, one being associated with the transmission of binary data and the other being associated with the clock pulses. It is also necessary to provide both a modulator-demodulator and a baseband converter.

However, the cost of devices using these known methods is relatively high.

SUMMARY OF THE INVENTION

The object of the present invention is to provide a method for differential half-duplex synchronous transmission-reception, which enables not only a considerable reduction in the cost of the device to be obtained, but also good immunity to interference induced along the line.

The present invention consists in a coding and decoding method for binary data and associated synchronous clock pulses, wherein the transmission is a half-duplex transmission-reception system effected over a single pair of conductors which allows both transmission of the binary data and transmission of the associated clock pulses.

The invention also relates to a device for carrying out the method according to the preceding paragraph, wherein, for decoding the binary data and recovering the synchronous clock pulses, the device includes for each conductor of the pair a differential amplifier and a resistor bridge which allow discrimination of the received signal with respect to the noise induced along the transmission chain.

DESCRIPTION OF PREFERRED EMBODIMENT

Figure 1:
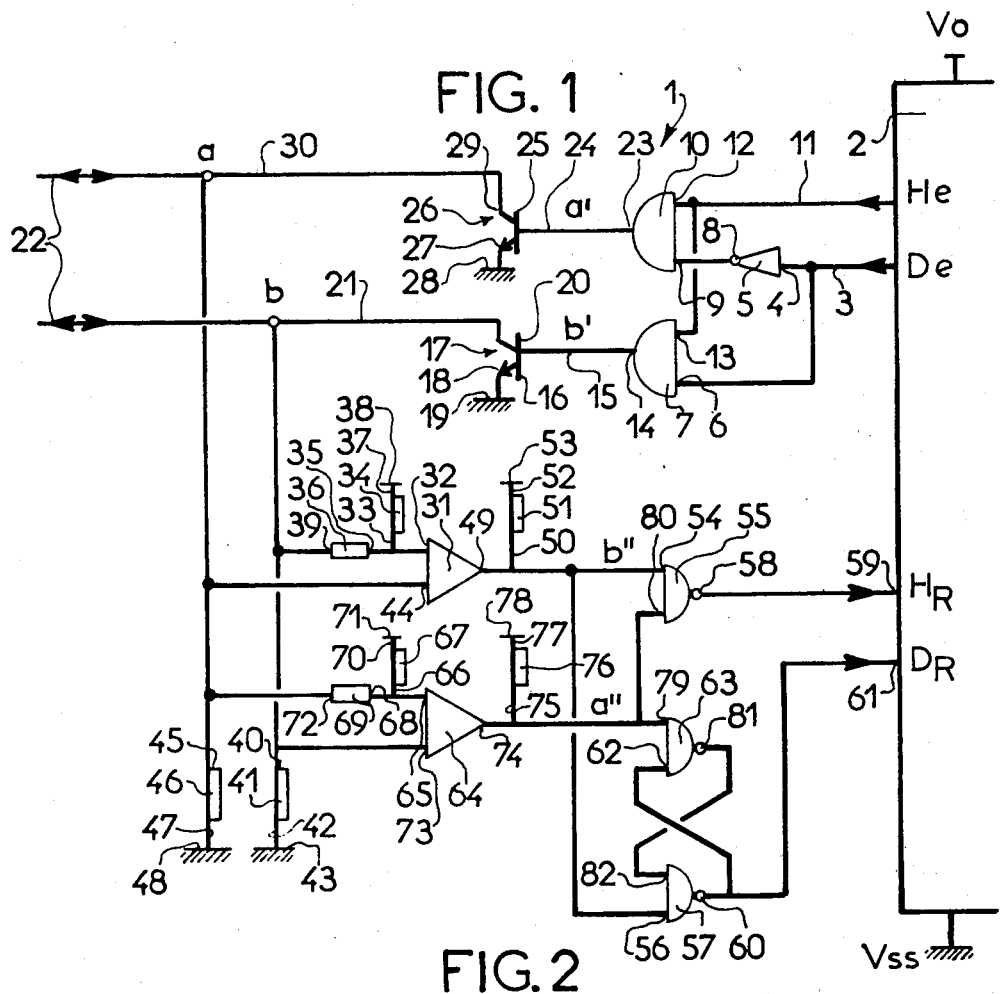
FIG. 1 is the basic circuit diagram of one form of device for carrying out the method according to the invention.

As shown in FIG. 1, a device 1 for coding and decoding binary data and associated synchronous clock pulses includes a logic processing circuit 2 supplied between the potentials $V_o$ and $V_{ss}$. A binary signal is fed from the logic processing circuit 2 through line 3 connected both to the input 4 of an inverter 5 and to one input 6 of a first AND gate 7. The output 8 of the inverter 5 is connected to one input 9 of a second AND gate 10. Likewise, from the logic processing circuit 2, clock pulses are fed through line 11 connected both to the second input 12 of the second AND gate 10 and to the second input 13 of the first AND gate 7.

The output 14 of the first AND gate 7 is connected through line 15 to the base 16 of a first transistor 17, the emitter 18 of which is connected to the electrical earth 19, and the collector 20 of which is connected to the first conductor 21 of a pair of conductors 22. Likewise, the output 23 of the second AND gate 10 is connected through line 24 to the base 25 of a second transistor 26, the emitter 27 of which is connected to the electrical earth 28, and the collector 29 of which is connected to the second conductor 30 of the pair of conductors 22.

For reception, a first differential amplifier 31 is provided, having its positive input 32 connected both to one end 33 of a first resistor 34 and to one end 35 of a second resistor 36.

The other end 37 of the first resistor 34 is connected to the potential 38. The other end 39 of the second resistor 36 is connected both to the line 21 and to one end 40 of a third resistor 41, the other end 42 of which is connected to the electrical earth 43.

The negative input 44 of the first differential amplifier 31 is connected both to the line 30 and to one end 45 of a fourth resistor 46, the other end 47 of which is connected to the electrical earth 48.

The output 49 of the first differential amplifier 31 is connected both to the end 50 of a fifth resistor 51, the other end 52 of which is connected to the potential 53, and to one input 54 of a first NAND gate 55 and one input 56 of a third NAND gate 57. The output 58 of the first NAND gate 55 is connected to the logic processing circuit 2 to return the received clock pulses 59. The output 60 of the third NAND gate 57 is connected both to the logic processing circuit 2 to return the received data 61, and to one of the inputs 62 of a second NAND gate 63.

In addition, a second differential amplifier 64 is provided having its positive input 65 connected both to one end 66 of a sixth resistor 67 and to one end 68 of a seventh resistor 69. The other end 70 of the sixth resistor 67 is connected to the potential 71. The other end 72 of the seventh resistor 69 is connected both to the line 30 and to the end 45 of the fourth resistor 46.

The negative input 73 of the second differential amplifier 64 is connected both to the line 21 and to the end 40 of the third resistor 41.

The output 74 of the second differential amplifier 64 is connected both to the end 75 of an eighth resistor 76 of which the other end 77 is connected to the potential 78, and to the second input 79 of the second NAND gate 63 and the second input 80 of the first NAND gate 55. The output 81 of said second NAND gate 63 is connected to the second input 82 of the third NAND gate 57. The gates 57 and 63 are assembled in such a manner as to form a R-S flip-flop.

The operation is as follows:

In the case of transmission, there are two signals He, De having two logic states, 0 and 1, and a composite signal is transmitted as follows:

| | |
|---|---|
| (a') = He $\overline{\text{De}}$ | (a) = $\overline{\text{He } \overline{\text{De}}}$ |
| (b') = He De | (b) = $\overline{\text{He De}}$ |

In the case of reception, a stable state is ensured by unbalance between the input voltages of the differential amplifiers.

The logic state 0 of (a) or of (b) corresponds to a physical state Vb.

The logic state 1 of (a) or of (b) corresponds to a physical state Vh.

Thus, by virtue of the coding structure, (a) and (b) are never at the level Vb at the same time.

The result is that the outputs a" and b" of the differential amplifiers are in the form:

$$a''=a=\overline{He\overline{De}}$$

$$b''=b=\overline{HeDe}$$

Figure 2:
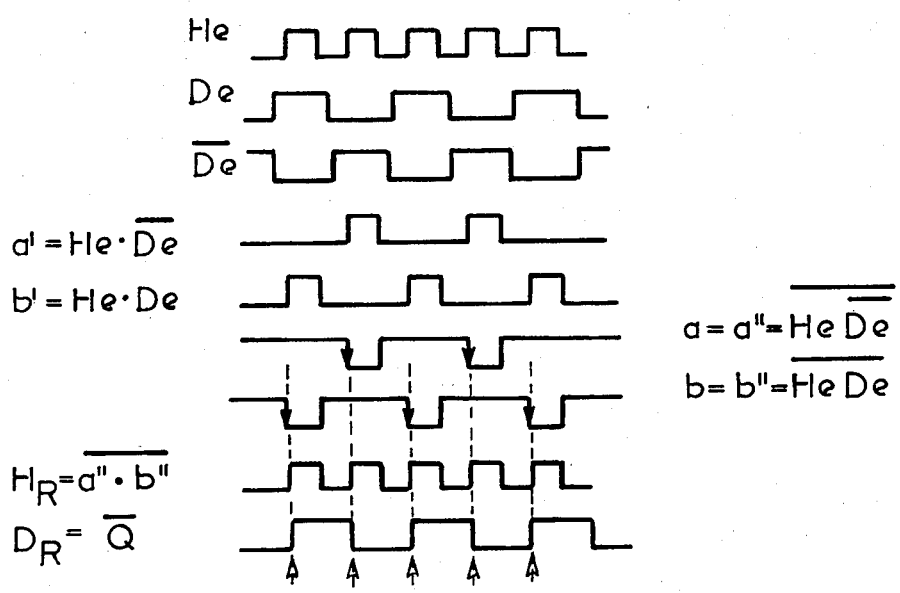
FIG. 2 shows waveforms associated with the circuit of FIG. 1.

$\underline{HR}=\overline{a''.b''}=\overline{He\ \overline{De}} \cdot \overline{He.De}=He\ \overline{De}+\overline{He\ De}=He\ \overline{De}+He\ De=He(\overline{De}+De)$ from which HR = He Reference will now be made to the waveforms shown in FIG. 2.

| | |
|---|---|
| The first line corresponds to | He |
| The second line corresponds to | De |
| The third line corresponds to | $\overline{De}$ |
| The fourth line corresponds to | $a' = He\ \overline{De}$ |
| The fifth line corresponds to | $b' = He\ De$ |
| The sixth line corresponds to | $a = a'' = \overline{He\ \overline{De}}$ |
| The seventh line corresponds to | $b = b'' = \overline{He\ De}$ |
| The eighth line corresponds to | $HR = \overline{a''.b''}$ |
| The ninth line corresponds to | $DR = \overline{Q}$ |
| The result is that | $DR = De$ |

Various modifications may be made within the scope of the present invention.

We claim:

1. Process of coding and decoding two binary signals of which one is a clock signal and the other a data signal which can symbolically take the value 0 or 1 on a pair of conductors which comprises:
   for coding:
   placing a first line of the pair of conductors in logic state 1 when the two binary signals are themselves simultaneously in logic state 1, otherwise it remains in logic state 0,
   placing a second line of the pair of conductors in logic state 1 when one of the signals is in logic state 1 while the other is in logic state 0, otherwise it remains in logic state 0.
   for decoding:
   placing the decoded output of the clock signal in logic state 1 when the two lines of the pair of conductors are simultaneously in logic state 1, otherwise said output is in logic state 0, and
   modifying the state of the decoded output of the data signal at the time of passage from logic state 1 to logic state 0 of either one of the coded signals of the lines of the pair of conductors.

2. Apparatus for coding and decoding two binary signals of which one is a clock signal and the other is a data signal, disposed between a source of emission and of reception of the clock signals and the data signals and a pair of conductors, comprising in its coding part:
   first and second AND gates of which the outputs are connected respectively to the two lines of said pair of conductors and of which the inputs are connected in parallel to the source of emission of the clock signal and the source of emission of the data signal, one of said AND gates having one of its inputs connected through an inverter, and comprising in its decoding part:
   a third AND gate for decoding the clock signal which is delivered at the output of said third AND gate and means connecting the inputs of said third AND gate with each of the outputs of said pair of conductors, and
   a memory circuit formed of two NAND gates connected in inverse loop as a flip-flop giving at is output the decoded data signal, and means connecting the inputs of said memory circuit respectively with the lines of said pair of conductors.

3. Apparatus for coding and decoding two signals according to claim 2, in which said means connecting said third AND gate and said memory circuit with said conductors comprises two differential amplifiers having inputs connected symmetrically to the lines of said pair of conductors, said third AND gate and said memory circuit each having their inputs connected with the outputs of said differential amplifiers.

4. Apparatus for coding and decoding two signals according to claim 3, in which said means connecting said third AND gate and said memory circuit with said conductors further comprises a resistance network for discrimination of said signals with respect to noise.

5. Apparatus for coding and decoding two binary signals of which one is a clock signal and the other is a data signal comprising a pair of conductors, a coding part disposed between said conductors and a source of emission of said signals and a decoding part disposed between said conductors and a point of reception of said signals,
   said coding part comprising a pair of AND gates of which the outputs are connected respectively to the two lines of said pair of conductors and of which the inputs are connected in parallel to a source of emission of said clock signal and a source of emission of said data signal, one of said AND gates having one of its inputs connected through an invertor, and
   said decoding part comprising a first NAND gate for decoding the clock signal which is delivered at the output of said first NAND gate and a memory circuit for decoding said data signal which is delivered at the output of said memory circuit, said memory circuit comprising second and third NAND gates connected in inverse loop to form a flip-flop, and means connecting inputs of said first NAND gate and said memory circuit in parallel to said pair of conductors.

6. Apparatus for coding and decoding two signals according to claim 5, in which said means connecting said first NAND gate and said memory circuit with said pair of conductors comprises a first differential amplifier having a negative input connected with a first conductor of said pair of conductors and a positive input connected with a second conductor of said pair of conductors, a second differential amplifier having a positive input connected with said first conductor and a negative input connected with said second conductor and means connecting said first NAND gate and said memory circuit in parallel to the outputs of said differential amplifiers.

7. Apparatus for coding and decoding two signals according to claim 6, in which said means connecting said first NAND gate and said memory circuit with said pair of conductors further comprises a resistance network for discrimminating said signals from noise.

8. Apparatus for coding and decoding two signals according to claim 5, in which the output of each of said AND gates is connected to the respective line of said pair of conductors through a transistor.

9. Apparatus for coding and decoding two signals according to claim 8, in which the output of each of said AND gates is connected to the base of a respective transistor, the emitter of which is connected to ground and the collector of which is connected to the respective conductor of said pair of conductors.

* * * * *